United States Patent Office 3,548,483
Patented Dec. 22, 1970

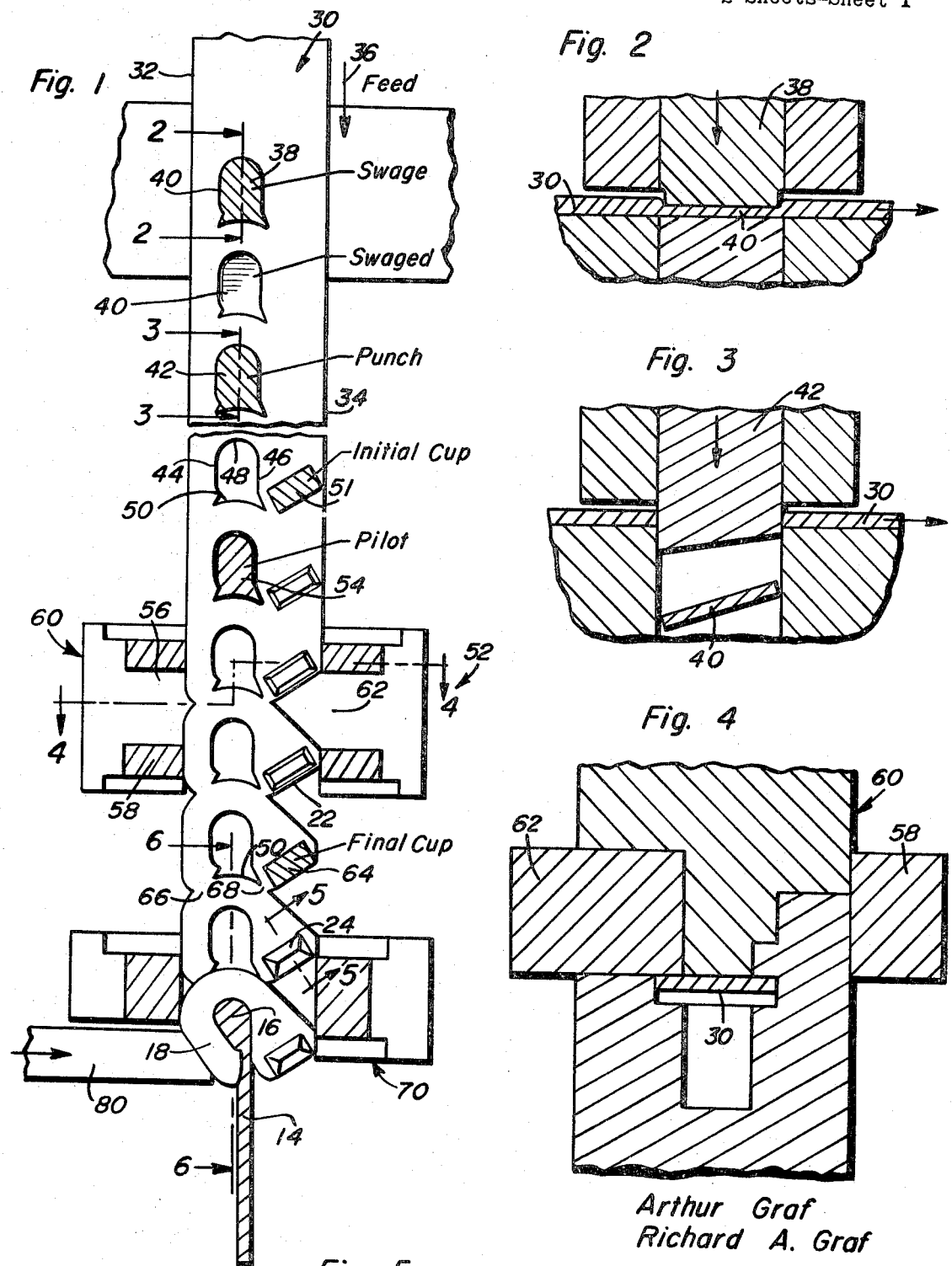

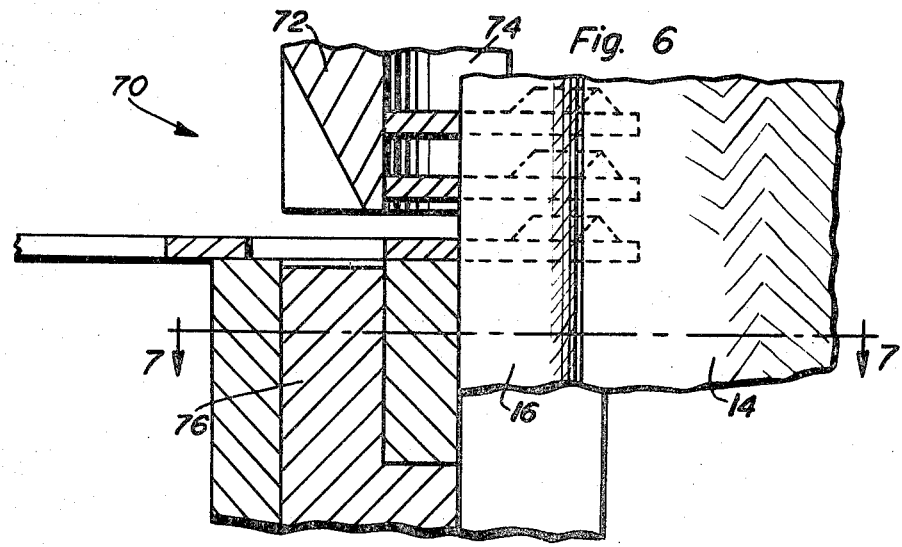
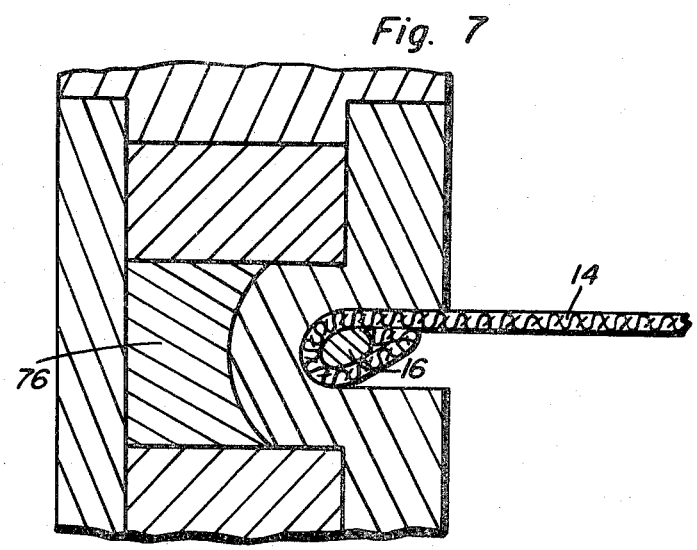
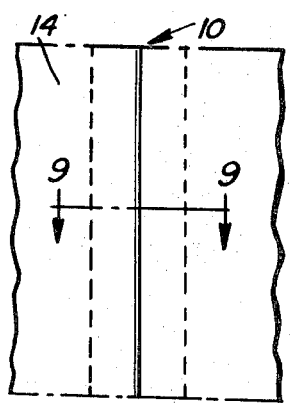
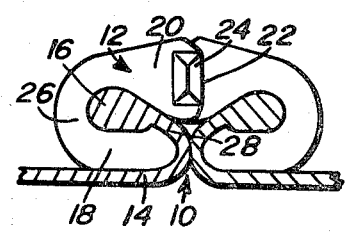
Arthur Graf
Richard A. Graf
INVENTORS

3,548,483
APPARATUS AND METHOD OF MANUFACTURING FASTENERS
Arthur Graf, 323 W. 43rd St., New York, N.Y. 10036, and Richard A. Graf, 627 Maple St., River Vale, N.J. 07675
Filed Aug. 13, 1969, Ser. No. 849,796
Int. Cl. B21d 53/52; B23p 19/04, 17/00
U.S. Cl. 29—410                                14 Claims

ABSTRACT OF THE DISCLOSURE

Slide fasteners made from stock intermittently advanced toward a moving tape on which the fastening elements are strung. Power operated tools swage, punch, laterally trim, cup, sever and clamp the fastener elements to the tape. Fastener elements are severed along spaced contour segments common to adjacent elements between asymmetrical leg portions. One of the leg portions has a laterally trimmed edge along which the locking projection is formed.

---

This invention relates to a method and apparatus for mass producing slide fasteners or zippers of the "invisible" type and more particularly to the manufacture of such fasteners in an economical fashion.

The locking elements for slide fasteners or zippers are usually manufactured by machines through which flat elongated metal stock is intermittently advanced toward a moving tape with a plurality of metal working tools operating on the stock while momentarily stationary so that as the stock is intermittently advanced toward the tape, the fastener elements are formed in stages, finally severed from the stock and clamped to the bead of the tape. A considerable amount of metal is however wasted in so forming the fastener elements from the stock. The amount of metal scrap or waste is particularly aggravated when fastener elements for an "invisible" type of zipper is being made because of the asymmetrical contour of such fastener elements. An important object of the present invention, therefore, is to provide a method and apparatus for making fastener elements with considerably less metal scrap or waste and further to make fastener elements which will provide a smoother operating slide fastener or zipper.

A method of reducing the amount of metal scrap during the fastener manufacturing process aforementioned, has been proposed in prior U.S. Pat. No. 2,486,941 including the swaging of a section of the stock at a location where it is to be cut out. However, such a swaging step results in lateral deformation of the parallel sides of the stock so as to increase the amount of side trim scrap that must be removed in forming the fastener elements.

Very often, it is necessary to space the fastener elements from each other on the stock in order to accurately form the contours of the fastener elements. By avoiding the spacing of the fastener elements from each other on the stock, the amount of scrap may be significantly reduced. Thus, another object of the present invention is to form the fastener elements without spacing on the stock yet avoiding an uneven contour because of slight error in feed.

In accordance with the present invention, fastener elements are formed by initially swaging a section elongated in the direction of feed to reduce the feed increment and preserve the parallel sides of the stock. The stock is also laterally trimmed and then cupped to form a locking projection along one of the trimmed edges so that the locking projection may extend right up to a final edge of the fastener element formed prior to severing in order to provide a better meshing and stronger swivel joints for the slide fastener assembly. The slide fastener elements are also severed along an arc by a cutter having an arcuate backing surface resisting the thrust of the closing jaw and thereby removing any deviations from the profile of the fastener elements between the laterally trimmed portions thereof. Further, severing is accomplished along spaced contour segments of the fastener elements common to adjacent fastener elements in order to avoid waste because of the spacing between the asymmetrical elements on the stock as disclosed in prior U.S. Pat. No. 3,171,194.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a somewhat schematic top plan view showing the various stages of manufacture associated with the present invention.

FIG. 2 is a partial sectional view taken substantially through a plane indicated by section line 2—2 in FIG. 1.

FIG. 3 is a partial sectional view taken substantially through a plane indicated by section line 3—3 of FIG. 1.

FIG. 4 is a partial sectional view taken substantially through a plane indicated by section line 4—4 in FIG. 1.

FIG. 5 is a partial sectional view taken substantially through a plane indicated by section line 5—5 in FIG. 1.

FIG. 6 is a partial sectional view taken substantially through a plane indicated by section line 6—6 in FIG. 1.

FIG. 7 is a partial sectional view taken substantially through a plane indicated by section line 7—7 in FIG. 6.

FIG. 8 is a partial front elevational view of an "invisible" type of slide fastener assembly.

FIG. 9 is a partial sectional view taken substantially through a plane indicated by section line 9—9 in FIG. 8.

Referring now to the drawings in detail, FIGS. 8 and 9 illustrate a slide fastener assembly generally referred to by reference numeral 10 constituting the product of the method and apparatus of the present invention. This type of slide fastener assembly is referred to as an "invisible" zipper because the intermeshing fastener elements 12 are concealed behind folded tapes 14 on which the fastener elements are strung. Each fastener element 12 as shown in FIG. 9, is clamped to the bead portion 16 of the tape and includes a deformed leg portion 18 about which the tape 14 is folded and an enlarged leg portion 20 terminating at an edge 22 overlapping the other fastener element with which it is enmeshed by means of the locking projection 24. The leg portions 18 and 20 of the fastener element are interconnected by an arcuate bridging portion 26 of a width substantially equal to that of the leg portion 18 except for the terminal hook end 28.

Referring now to FIG. 1, the formation of the fastener elements 12 from a flat, elongated metal stock 30 will become apparent. The stock 30 which includes parallel side edges 32 and 34 is intermittently advanced in the direction of arrow 36 toward a tape 14 which is moved in a direction perpendicular to the feed movement of the stock so that as the fastener elements are severed from the stock they are strung in spaced relation along the bead portion 16 of the tape. Movement of the tape and incremental advancement of the stock is of course synchronized as is well known by those familiar with fastener making machines of the type with which the present invention is associated. Machines of this type are disclosed, for example, in my prior Pat. No. 3,171,194 aforementioned.

As is well known, between intermittent advancements of the stock 30, a plurality of power reciprocated, metal working tools operate on the stock to form the fastener elements in stages. The initial stage in the formation of the fastener element involves swaging or deformation of the metal of the stock. In accordance with the present invention, a swaging tool 38 as shown in FIGS. 1 and 2, engages the stock along a section 40 having a shape which is elongated in the direction of feed and spaced between the parallel side edges 32 and 34 closer to the edge 32. The swaged section 40 is thereby reduced in thickness as shown in FIG. 2 accompanied by a corresponding elongation of the stock in the direction of feed so that the amount of feed during each intermittent advancement of the stock, may be reduced to a value less than the length of the fastener elements in the direction of feed. A saving in metal is thereby realized. Further, by swaging the stock along a section elongated in the direction of feed, the parallel sides of the stock may be preserved.

After the stock is initially swaged, the swaged portion 40 is advanced to a second operating station at which a punch 42 pierces the stock and removes the swaged portion 40 therefrom as shown in FIG. 3. The opening punched out from the stock includes inner side edges 44 and 46 as shown in FIG. 1, partially forming the leg portions of the fastener element, an arcuate edge 48 interconnecting the side edges 44 and 46 to partially form the bridging portion of the fastener element and a forward arcuate edge 50 forming part of a common connecting contour between adjacent fastener elements on the stock.

After the stock has been punched out, it is initially cupped by a tool 51 to form a projection adjacent the cut-out. The partially formed fastener after being initially cupped is advanced to a lateral trimming station, generally referred to by reference numeral 52 in FIG. 1. Optionally a pilot element 54 may be inserted in the cut-out preceding the trimming station 52 in order to maintain the shape of the cut-out as the stock is being laterally trimmed. At the trimming station, the side edge 32 is laterally trimmed by a die insert 56 mounted between the heels 58 of a punch tool assembly 60 so that a relatively small scrap of metal may be removed by suction means. A relatively larger scrap of metal is laterally removed from the edge 34 of the stock by the die insert 62. Thus, when the stock leaves the lateral trimming station, the fastener element is substantially formed including the trimmed edge 22 extending at an angle to the side edge 34 of the stock.

As each substantially formed fastener element leaves the lateral trimming station, it is next engaged by a final coupling tool 64 as shown in FIG. 1 in order to form the locking projection 24 right up to the trimmed edge 22 as more clearly shown in FIG. 5. The formation of the projection by the cupping tool along a final edge 22 of the fastener element will avoid any spacing between the edge 22 and the longitudinal side of the locking projection that ordinarily occurs when the locking projection is formed prior to formation of the adjacent final edge by a severing tool. A beneficial feature of the present invention therefore resides in laterally trimming the stock to form a final edge before the locking projection is fully formed at such edge.

It will be noted from FIG. 1, that the fastener elements being formed on the stock are connected to each other along spaced contour segments 66 and 68 which form a common curved contour together with edge 50 between adjacent fastener elements. Thus, the forwardmost fastener element in the direction of feed is severed at the common contour segments 66 and 68 by a severing punch assembly 70 as more clearly seen in FIGS. 6 and 7. The punch assembly includes a cutting tool 72 having a cutting edge formed at the lower end of an arcuate backing surface 74. Accordingly, as the cutting tool 72 moves downwardly it severs the forwardmost fastener element from the stock and downwardly deflects the following fastener element against the upward bias exerted on a pressure pad 76 underlying the cutting tool. When severing the fastener element at the common contour segments 66 and 68, the arcuate backing surface 74 of the cutting tool 72 resists the thrust exerted on the smaller leg portion 18 by a closing jaw 80 as shown in FIG. 1. Thus, the closing jaw deforms the leg portion 18 in order to clamp the fastener element to the tape 14 as it is severed from the stock. Because of the backing surface 74 on the severing tool 72, any deviation from the smooth contour of the bridging portion 26 of the fastener element will be swaged and disappear to avoid deviations that ordinarily occur because of feed error.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a method of forming fastener elements interconnected along common contours on elongated stock having side edges, the steps of: forming spaced openings in the stock bordered by the common contours between laterally spaced segments thereof; trimming the side edges of the stock leaving the fastener elements interconnected only along said laterally spaced segments; and severing the fastener elements from the stock along said spaced segments.

2. The method of claim 1 wherein said openings are asymmetrically located between the side edges to form leg portions.

3. The method of claim 2 including the steps of: clamping one of the leg portions of each of the fastener elements when severed onto a tape; and cupping the other of the leg portions between the trimming and servering steps to form locking projections thereon.

4. The method of claim 3 wherein the other of the leg portions include trimmed edges extending at an angle to one of the side edges of the stock, said locking projections being formed at said trimmed edges.

5. In a method of forming fastener elements from elongated stock having side edges, the steps of: trimming at least one of the side edges of the stock of partially form leg portions of the fastener elements including terminal edges thereof; severing the fastener elements from the stock; and cupping said leg portions between the trimming and severing steps to form locking projections extending to the terminal edges.

6. The method of claim 5 wherein said leg portions include trimmed edges extending at an angle to said one of the side edges of the stock.

7. In a method of forming fastener elements from flat elongated stock having side edges, between intermittent advancements of the stock in a direction parallel to said side edges, the steps of: trimming the side edges of the stock to form asymmetrical leg portions of the fastener elements; severing each fastener element from the stock along fastener contour segments common to adjacent fastener elements; swaging the stock along sections of the stock spaced from said side edges and elongated in said direction of advancement; and punching the swaged sections of the stock to partially form bridging portions between the leg portions of the fastener elements separating the common contour segments thereof.

8. The method of claim 7 including the steps of: clamping one of the leg portions of each of the fastener elements when severed onto a tape and cupping the other of the leg portions between the trimming and severing steps to form locking projections thereon.

9. The method of claim 8 wherein the other of the leg portions include trimmed edges extending at an angle to one of the side edges of the stock, said locking projections being formed at said trimmed edges.

10. Apparatus for forming fastener elements from elongated stock intermittently advanced toward a tape to which the fastener elements are clamped, including a plurality of cutting tools laterally trimming and internally piercing the stock between said advancements thereof to form the fastener elements interconnected along common contour segments, closing jaw means engageable with the fastener elements when severed from the stock to clamp the same to the tape, means for severing the fastener elements from the stock along said common contour segments, and means for swaging sections of the stock elongated in the direction of advancement, one of said cutting tools removing the swaged sections of the stock.

11. The combination of claim 10 wherein said severing means includes a cutting blade having an arcuate backing surface bridging the common contour segments between adjacent fastener elements to absorb the thrust of the closing jaw means.

12. The combination of claim 10 including means for cupping the stock along edges laterally trimmed therefrom by another of the cutting tools.

13. The combination of claim 10 including means for cupping the stock along edges laterally trimmed therefrom by another of the cutting tools.

14. Apparatus for forming fastener elements from elongated stock intermittenly advanced toward a tape to which the fastener elements are clamped, including a plurality of cutting tools laterally trimming and internally piercing the stock between said advancements thereof to form the fastener elements interconnected along common contour segments, closing jaw means engageable with the fastener elements when severed from the stock to clamp the same to the tape, means for severing the fastener elements from the stock along said common contour segments, and means for cupping the stock along edges laterally trimmed therefrom by one of the cutting tools.

References Cited
UNITED STATES PATENTS

| | | | |
|---|---|---|---|
| 2,486,941 | 11/1949 | Graf | 29—148 |
| 2,685,127 | 8/1954 | Kaufmann | 29—410 |
| 3,171,194 | 11/1961 | Graf | 29—410 |
| 3,259,476 | 7/1966 | Hair | 29—193.5 |

THOMAS H. EAGER, Primary Examiner

U.S. Cl. X.R.

29—207.5, 417